United States Patent
Sakai et al.

[11] Patent Number: 5,878,323
[45] Date of Patent: Mar. 2, 1999

[54] PROCESS FOR PRODUCING SPLIT TYPE MECHANICAL PART

[75] Inventors: Jun Sakai, Tokyo; Junichi Ichikawa, Matsudo; Zenzo Ishijima, Matsudo; Shuji Sasaki, Matsudo; Hideo Shikata, Matsudo; Katsuhiko Ueda, Matsudo; Hideo Urata, Wako, all of Japan

[73] Assignee: Honda Giken Kogyo Kabushiki Kaisha, Tokyo, Japan

[21] Appl. No.: 513,249

[22] Filed: Aug. 10, 1995

[30] Foreign Application Priority Data

Aug. 12, 1994 [JP] Japan ................................. 6-190426
Dec. 15, 1994 [JP] Japan ................................. 6-333282

[51] Int. Cl.$^6$ ............................. B22F 5/00; B23P 9/00; B23P 15/00
[52] U.S. Cl. ............................. 419/28; 419/29; 419/51; 29/888.092; 29/DIG. 2; 29/DIG. 31
[58] Field of Search ................................. 419/28, 29, 51; 29/888.092, DIG. 2, DIG. 31

[56] References Cited

U.S. PATENT DOCUMENTS 5,051,232  9/1991  Summers .
5,566,449  10/1996  Okamoto et al. .

FOREIGN PATENT DOCUMENTS

| 39 04 020 A1 | 8/1990 | Germany . |
| 93 05 170.0 | 7/1993 | Germany . |
| 43 32 444 A1 | 3/1995 | Germany . |
| WO 94/15737 | 7/1994 | WIPO . |

Primary Examiner—Daniel J. Jenkins
Attorney, Agent, or Firm—Nikaido, Marmelstein, Murray & Oram LLP

[57] ABSTRACT

A plurality of blanks divided at a division end face 5 or a blank-bonded product comprising a plurality of blanks sintered and bonded together are or is compressed in the same mold, so that they are plastically deformed until the division end faces 5 are cohered. Thereafter, a load is applied to the plastically worked product in a direction of breaking of the division end faces 5 to break the division end faces 5 and divide the plastically worked product into a plurality of members. In this manner, a split type mechanical part having irregularities meshed with each other on mating faces and easily positionable relative to each other can be produced with a good dimentional accuracy.

14 Claims, 8 Drawing Sheets

PROCESS FOR PRODUCING SPLIT TYPE MECHANICAL PART

BACKGROUND OF THE INVENTION

1. Field of the Invention

The present invention relates to a process for producing a split type mechanical part such as a connecting rod, a cap for the connecting rod, and a split sliding or plain bearing for use, for example, in an internal combustion engine, a piston-type compressor, a piston pump and the like.

2. Description of the Prior Art

Figure 1:
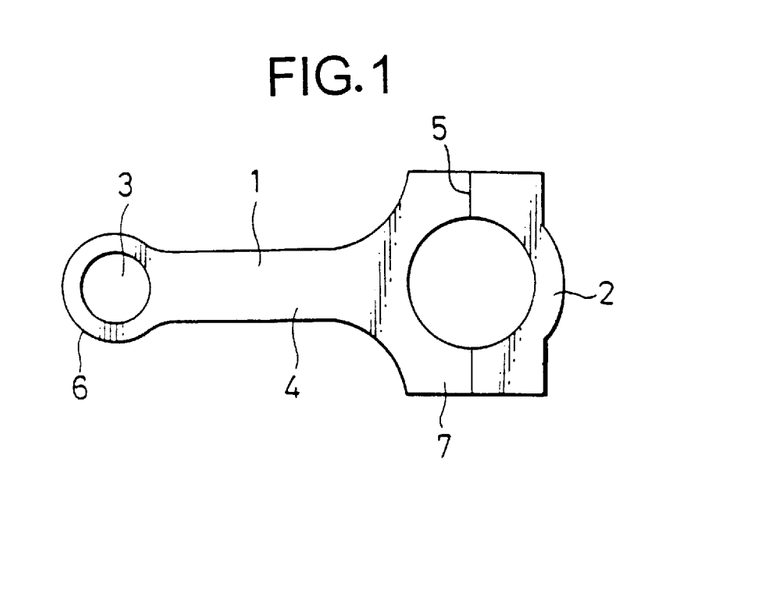
FIG. 1 is a plan view of a connecting rod produced by a process according to an embodiment of the present invention.

In general, a connecting rod has a shape such that a smaller end 6 including a piston pin hole 3 is connected with a larger end 7 including a hole in which a crank-pin of a crankshaft is fitted, as shown in FIG. 1. The larger end 7 is in a half-split state in which it is divided at a mating face (division end face) 5 for easy assembling, and the connecting rod includes a main body section 1 and a cap section 2. The main body section 1 and the cap section 2 are integrally fixed to each other by a bolt passed through a bolt bore which is not shown.

When the main body section 1 and the cap section 2 of the connecting rod are produced, the main body section 1 and the cap section 2 are formed into an integral configuration by casting, forging or the like, and subjected to a cutting and a following processing such as scraping and shaving, or both of the members are separately fabricated by casting or forging and subjected to a scraping and shaving processing or the like.

When the connecting rod is produced in a powder metallurgical process, the main body section and the cap section are compacted and sintered into an integral configuration, and if necessary, the resulting material is subjected to a forging to provide a high density, and then divided into the main body section and the cap section. The following four methods are examples of such dividing methods: 1) a method in which division aiding holes are previously provided in an intended breaking area, and the product is broken at the intended breaking area, as described in Japanese Utility Model Publication No. 47453/82 and Japanese Patent Publication No. 26087/90; 2) a method in which a cutout groove is provided in each of opposite end faces of the intended breaking area, the remaining wall portion is broken, and the resulting members are then cut, as described in Japanese Patent Publication No. 44890/83; 3) a method in which portions having different hardnesses are previously provided in an intended breaking area by a carburizing hardening, and the product is broken at the intended breaking area, thereby providing irregularities on the broken face; and 4) a method in which a groove is previously provided in a molded product at a place to serve as an intended breaking area, and an oxide film is formed in the groove by sintering and forging, and then the product is broken.

In the case of a method of adjusting the degree of true circularness, the size and the shape of a blank such as a cast product, a forged product, a sintered product and the like formed into an integral or divided configuration by cutting or scraping and shaving processing, a high-level processing technique is required and in addition, the number of processing steps is large, and therefore, there is a room for improvement for a reduction in cost.

As compared with a classical producing process including such scraping and shaping, the above-described conventional breaking/dividing method is advantageous in respect of cost, because it includes no step of scraping and shaving the divided end faces. In addition, such method has an advantage that the broken faces can be used directly as mating faces, and irregularities to be meshed with each other are produced on the mating faces and hence, the main body section and the cap section can be positioned.

However, such conventional method has problems that a considerably large breaking load is required for the division, that there is a limit for selection of the material, because a deformation is liable to be produced in the case of a material having a high ductility as in an aluminum alloy, that the product may be broken at a location other than the intended breaking/dividing area, and that there is a room for improvement in the work of positioning during assembling.

SUMMARY OF THE INVENTION

It is an object of the present invention to provide a process for producing a split type mechanical part which has a good shapability and a close-adhesion strength sufficient to avoid separation of members when subjected to a machining, which is easy to divide, and which improves the work of positioning and provides a good assembling dimensional accuracy during assembling thereof.

To achieve the above object, according to a first aspect and feature of the present invention, there is provided a process for producing a split type mechanical part, comprising the steps of: preparing a plurality of blanks made of an ingot material or a sintered material, divided at intended dividing faces; pressing the blanks with the intended dividing faces opposed to each other in a mold to plastically deform the blanks until the intended dividing faces are cohered to each other, thereby providing a plastically worked product; and applying a load to the plastically worked product in a direction to break the product at the intended dividing faces, thereby breaking and dividing the plastically worked product into a plurality of members.

The blank is made by a forging, a casting, a punching, a breaking, a cutting and the like in the case of an ingot metal material, or made in a powder metallurgical process. An alloy which may be used as the material is an alloy plastically deformable at ambient temperature or by heating, such as an iron alloy, a copper alloy, an aluminum alloy and the like. Particularly, the aluminum alloy is suitable. A combination of an ingot material and a sintered alloy may be used, so that the ingot material is used for one of the members, and a sintered alloy is used for the other member.

According to a second aspect and feature of the present invention, there is provided a process for producing a split type mechanical part, comprising the steps of: preparing a plurality of blanks made of a sintered material divided at intended dividing faces which are located so as to traverse a bore of a resultant product; sintering and bonding the blanks with the intended dividing faces abutting against each other to provide a sintered product; placing the sintered product into a plastically working mold while expanding the bore; breaking the sintered product at sintered and bonded faces of the product, or producing a crack in the sintered product extending along the sintered and bonded faces and then, pressing broken pieces of the product or the product in a cracked state; plastically deforming the broken pieces of the product or the cracked product until the pieces are cohered to each other or until the cracked product is re-invited at the intended dividing faces, thereby providing a plastically worked product; and applying a load to the plastically worked product in a direction to break the plastically worked product at the intended dividing faces, thereby breaking and dividing the plastically worked product into a plurality of members.

In this case, the blank may be produced which has a shape such that the inside diameter of the bore in the sintered product bonded at an area traversing the bore is smaller than a core rod of the plastically working mold, and the contour of the bore is smaller than an internal bore in a die of the plastically working mold. In the course of placing the sintered product into the mold, the internal bore in the blank may be expanded by the core rod to break the bonded faces, or to provide cracks in the bonded faces. Thereafter, the sintered product may be pressed and plastically deformed in the mold.

The blanks of the wintered alloy can be produced by separately compacting each of the members and then sintering them. In this case, the blanks may be produced using separate molds, or by simultaneously compacting the sintered alloys using a mold which has cavities defined in a single die for shaping the blanks. Another method for producing a green compact divided into two portions may be to compact a material into an integral configuration with blanks united to each other, and then break and divide the resulting green compact at intended dividing faces into the two portions. The breaking may be achieved by a procedure which comprises fixing one of sides of the green compact and urging an edged tool into an end face or an outer surface at an intended dividing area. In this case, it is preferable that a U- or V-shaped groove is previously provided at the intended dividing area, and it is desirable that a moderate thrust is applied for urging the edged tool in a direction to break the intended dividing area.

Sintered products having different densities and different heights in a pressing direction may be plastically deformed.

Further, sintered products with at least intended dividing faces subjected to a shot blasting treatment or a brushing may be pressed and plastically deformed. When a blank to be plastically worked is divided into two members, a step can be added of previously forming relatively small irregularities on intended dividing faces of the blank by a shot blasting, a wire brushing or the like in order to enhance the bonding strength for both the plastically deformed members.

If the members are made of alloys of different compositions, it is possible to cope with natures required for partial constructions of a mechanical part.

The intended dividing faces (mating faces) of the blank may be flat, and irregularities can be previously provided on one of the mating faces, or irregularities meshed with each other can be previously provided on the mating faces of both the blanks by a casting mold, a metal mold or the like.

When a plurality of blanks are formed from sintered products, a split type mechanical part having different partial densities can be produced, if the sintered products have different densities or heights.

It is preferable that after a coating film of a metal which is melted at a temperature equal to or lower than a sintering temperature is formed on the intended dividing face of at least one of sintered alloy green compacts derived from the blanks, the green compacts are sintered and bonded with the intended dividing faces put into abutment against each other. By forming a coating film of a low-melting metal meltable at a temperature equal to or lower than the sintering temperature of the green compacts on division end faces of the green compacts by application or the like in sintering and bonding the green compacts, the sinter bonding is firm, and when the bonded faces are broken or cracked prior to the plastic working, the broken faces are roughened faces thereby making it possible to enhance the bonding strength for both the members after being plastically worked. The low-melting metal may be copper when the blank is made of an iron alloy; or tin (Sn) or a tin alloy when the blank is made of a copper ally; or tin (Sn), an Al—Sn alloy, Al—Zn alloy, an Al—Mg—Zn alloy or the like when the blank is made of an aluminum alloy.

On the other hand, in order to reduce the bonding strength for both the plastically deformed members, a releasable coating film can be provided on one of intended dividing faces of the blanks. The coating film can be formed by utilizing any of oils such as a usual plastic working lubricant, a lubricating oil, a grease and the like; oils and fats such as wax, vegetable and animal oils and fats, soap and the like; polymer compounds such as CMC, vinyl acetate, celluloses and the like; and coating materials such as graphite coating, paints and the like. The formation of the coating film can be achieved by applying any of the above-described organic compounds to the blank before being plastically worked, by applying any of the above-described organic compounds to the green compact in the case of the sintered blank, or by applying any of the above-described organic compounds and then heating it to form a carbonized coating film in a warm or hot plastic working. In the case of an iron alloy, a phosphate coating film can be formed.

The size of the blank may be set at a small size relative to the shape of the die of the plastic working mold, and the blank may be deformed laterally, or deformed into the substantially same profile. Alternatively, the size of the blank may be set at a slightly larger size relative to the shape of the die of the plastic working mold, and the blank may be deformed so that it may be squeezed.

In the plastic working of the mechanical part divided at the bore, using a mold having a structure in which the core rod for shaping the bore in the mechanical part is axially divided into two portions, and the opposed faces of the core rod define a gap in the mold cavity, the blanks are pressed and plastically deformed until the intended dividing faces are cohered, thereby providing a plastically worked product, and a web is formed in the bore in the plastically worked product.

When the amount of blank plastically deformed is desired to be increased, a mold designed to form an excess metal (web) may be used. It is preferable that the excess metal is provided on an inner peripheral surface of the bore in the part. For this purpose, the mold is used which has the structure in which the core rod for shaping the bore in the mechanical part is axially divided into two portions, and the opposed faces of the core rod define the gap in the mold cavity.

When the blank is plastically deformed in the mold, any one of the cold, warm and hot plastic working is used depending upon the type of the alloy, the shape of the blank, the density required in the use of the sintered alloy, and the like.

Further, the plastically worked product resulting from the warm or hot plastic working is pressed and sized at ambient temperature, and the stress in the vicinity of the intended dividing face or the crack extending along the intended dividing face is increased.

In order to weaken the bonding force of the split type mechanical part with the blanks plastically deformed and cohered by any of the above-described methods to further facilitate the division, a method can be added which includes pressing the blanks at a warm or hot temperature to plastically deform them, and then pressing the plastically worked product at ambient temperature to size it and, while increasing the stress in the intended dividing face, or increasing the crack extending along the intended dividing face, or a method can be added which includes heating and quenching the plastically worked product or the sized product to increase the stress or the crack in the intended dividing area. The heating and quenching can serve as a hardening/tempering of a steel material and as a solution treatment of an aluminum alloy.

The split type mechanical parts which may be suitably produced by this producing process, include a connecting rod, a sliding bearing such as a split bearing mounted at a larger end of the connecting rod, and the like. The producing process according to the present invention is most preferable, when a connecting rod of an aluminum alloy having a high ductility and easily plastically deformable is produced.

The aluminum sintered alloy proposed in Japanese Patent Application No. 37606/94 filed by the present assignee is excellent in wear resistance and ductility, and has a strength and a bearing sliding characteristic suitable for a connecting rod. Therefore, this aluminum sintered alloy can be used as it is, only by subjecting axial holes in larger and smaller ends to a working or processing such as a cutting processing. The details for the composition and the metallographic structure of this aluminum sintered alloy are described in Japanese Patent Application No. 37606/94. The basic composition is an Al—Si—Cu—Mg based alloy composition which has a mottled structure comprising an Al—Si based alloy phase containing a predetermined amount of Si in a primary crystal Si dispersed state, and a relatively soft Al solid solution phase; in which hard grains are prevented from being fallen off, and which is excellent in wear resistance (a scratch wear is decreased). This aluminum sintered alloy is an alloy which has a strength and a wear resistance improved by specifying the area ratio of the mottled structure in a range of 20 to 80:80 to 20 and the maximum grain size of the primary crystals Si in a range of 5 to 60 $\mu$m; in which the Cu alloy phase at the grain boundary is decreased by the fact that the alloy contains a predetermined content of a transition metal; and which has an improved ductility.

As in the prior art, the plastically worked connecting rod or bearing may be subjected to a proper cutting or scraping and shaving, and if necessary, may be subjected to a thermal treatment (e.g., a hardening, a tempering, a solution treatment, and an aging treatment) or a surface treatment in order to enhance the nature of the alloy.

The division of the split type mechanical part having two portions or members plastically worked and closely bonded to each other can be carried out after boring or cutting. The division can be achieved by folding the split type mechanical part at the intended dividing face, by press-fitting a tapered pin into the axial hole, or by mounting dividing jigs into the axial hole in a fitting manner and pushing a wedge into between jigs to expand the jigs.

Thus, according to the present invention, the mating faces (cohered faces) of a plurality of plastically worked members are cohered to produce an undulation by a plastic flowing of the corresponding material and to form a plurality of wavy irregularities (wrinkles). This is more significant with an alloy which is easily plastically deformable, or an alloy which has been heated into a plastically deformable form.

This moderate close adhesion is advantageous in working efficiency and dimensional accuracy, because the plurality of members cannot be displaced during cutting or during making of a threaded bore. When the members are assembled to each other in a united/aligned manner after division of the split type mechanical part, the positioning operation is facilitated and the positioning accuracy is improved, by the undulation and the wavy irregularities.

In usual, an oxide is formed on the surface of the alloy blank, and the cohered faces (intended dividing faces) plastically worked are brittly bonded to each other and hence, the cohesion is not very firm. Therefore, the cohered faces can be easily separated from each other by an external force.

When the blank is a sintered alloy, the divided green compacts can be fabricated with a good efficiency by a method for molding the green compacts in a single die. According to a method for breaking and dividing the integrally molded green compact at a predetermined point, a breaking load as large as breaking a sintered or forged product is not required, and the broken face has a large number of irregularities. Thus, the positioning workability and the positioning accuracy can be improved by cooperation of the undulation and the wavy irregularities on the cohered faces.

If the bonded product with blanks sintered and bonded into an integral form is used, the handling property in inserting the product into a plastic working mold is improved. When this sintered/bonded product is inserted into a cavity in the plastic working mold, if the bore in the bonded product is expanded by a core rod of the mold to produce a crack in the bonded area or to break the bonded area, the cracked or broken face becomes rugged. Thereafter, the product is urged by upper and lower punches, so that it is plastically deformed until the intended dividing faces are cohered to each other, thereby further increasing rugged irregularities in addition to the undulation and the wavy irregularities on the cohered faces to improve the positioning workability and the positioning accuracy.

If a coating film of a low-melting metal which is alloyable with the blank is formed on the bonded face in sintering/bonding, the sintering/bonding force is increased and therefore, the rugged irregularities resulting from the cracking and the breaking before the plastic deformation can be further enlarged.

Further, if irregularities are provided on the division end faces of the blank by the blank forming mold, the contact area of the mating faces after plastic working is large, which provides an effect of increasing the bonding force after the plastic working to make the breaking division difficult. The irregularities further facilitate the positioning, when the blank is supplied into the mold for plastic working, when the plastically worked product is subjected to a cutting or scraping and shaving, or a making of a bolt bore, or when the members are aligned and united again after division.

If the division end face of at least one of the divided blanks is subjected to a shot blasting or a brushing as another means for strengthening the bonding, prior to the pressing for plastically deformation, the stains on the division end face are reduced; a new face is partially produced, and the irregularities on the faces are meshed together due to the plastic deformation, thereby making the division difficult.

If the contour of the material to be plastically worked is formed by the die of the mold in the plastic working, so that a web (excess metal) is formed in an axial hole, the excess metal portion acts to make both the members difficult to separate, because the material is relatively firmly bonded. The member-bonding force can be adjusted by the size of the excess metal in the axial hole, and if the excess metal is removed, the division can be easily achieved. If the excess metal is provided, the parallelism of the end faces of the plastically worked product is easily obtained.

On the other hand, if any of various coating films or any of releasable coating films is provided on the division end face of the blank to be plastically worked, the close adhesion of both the members after being plastically worked is weakened and hence, the division of the plastically worked product can be easily achieved.

Even if a step of producing a crack or an internal concentrated force in the cohered area of the plastically worked product is added, the division can be easily achieved. The crack or the internal force can be provided by compressing the plastically worked product in the mold at ambient temperature. This step is further effective, when the axial bore is expanded by the core rod, or when an intermetallic compound is formed in the cohered face. In addition, even if the plastically worked product or the sized product is heated and quenched, the stress can be likewise concentrated to facilitate the division.

It is possible to adjust the bonded state (the breaking and dividing property) of the plastically worked product by the material, size and thickness of the split type mechanical part, the need or needlessness for cutting or scraping and shaving processing, and the like. Both of a means for increasing the bonding force and a means for decreasing the bonding force can be used.

In the producing process according to the present invention, various alloys capable of being plastically worked can be utilized irrespective of ingot materials and sintered alloys. Any of combinations of alloys can be properly selected depending upon the required performance, and for example in the case of a connecting rod, any of following combinations can be used: a combination of alloys such that an alloy having a high strength and a good sliding characteristic is used for the main body section, and a lower-grade alloy is used for the cap section, a combination of alloys such that a sintered alloy is used for the main body section and an ingot material is used of the cap section, and the like.

When the part is made of the sintered alloy, a plurality of members, into which the part is divided, can be made with different densities in consideration of the strength, the sliding movement, the oil-containing characteristic and the reduction in weight. For example, if the cap section of the connecting rod is made with a decreased density, the weight of the cap section is reduced, so that the inertial force in use of the connecting rod can be reduced. In addition, the amount of oil contained in a low-density portion of the bearing can be increased. The production of members having different densities can be achieved by using green compacts having different densities, or by using blanks having varied heights such that the blanks are plastically deformed at different amounts in the plastic working.

According to this producing process, the plastically worked product can be divided with a light force and therefore, the producing process is particularly suitable for production of the split type mechanical part from a copper alloy or an aluminum alloy which is easily deformable during division in the prior art process.

With an aluminum alloy matched with the tendency to reduce the weight of the part, the undulation and the wavy irregularities (wrinkles) are easily produced on the cohered faces by the plastic working because of an excellent ductility of the aluminum alloy, thereby making it possible to easily achieve the positioning correctly and with a good accuracy during assembling. In addition, the production of the blank by a powder metallurgical process is excellent in shapability and mass-productivity and hence, is preferred.

The above and other objects, features and advantages of the invention will become apparent from the following description of preferred embodiments taken in conjunction with the accompanying drawings.

DESCRIPTION OF THE PREFERRED EMBODIMENTS

The present invention will now be described by way of preferred embodiments with reference to the accompanying drawings.

FIG. 1 is a plan view of a connecting rod produced by a process according to the present invention. Referring to FIG. 1, the connecting rod is divided into a main section 1 and a cap section 2. The main section 1 is of such a structure that a smaller end portion 6 having a piston pin hole 3 and a larger end portion 7 are connected to each other by a rod portion 4. A near-net shaped blank for the main section 1 and the cap section can be fabricated by any of a casting, a forging, a powder metallurgy and the like. The fabrication of the blank by the powder metallurgy will first be described below.

Figure 2:
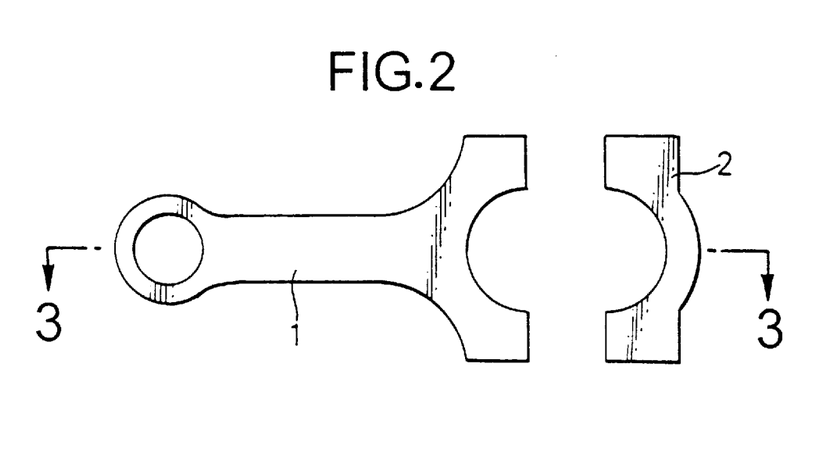
FIG. 2 is a plan view of the connecting rod in a divided state.

FIG. 2 is a plan view of the connecting rod in a state in which it has been divided at division end faces into the main section 1 and the cap section 2. In such an arrangement, a cavity is provided in a powder molding die to perform a powder molding.

Figure 3:
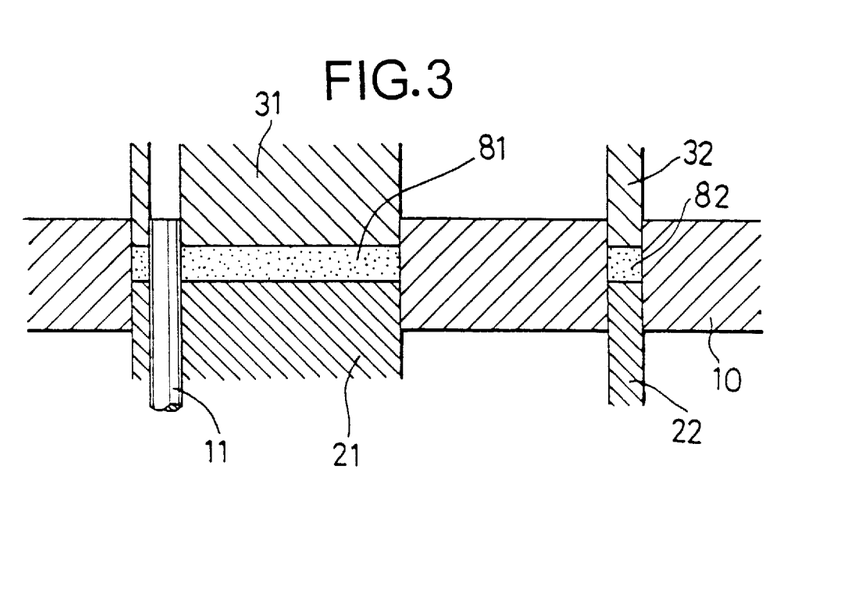
FIG. 3 is a vertical sectional view of an essential portion of a mold for explaining the powder molding of the connecting rod shown in FIG. 2.

FIG. 3 is a vertical sectional view of a mold for producing the connecting rod shown in FIG. 2. The mold is comprised of a die 10 having die bores for molding the main section 1 and the cap section 2, a smaller-diameter core 11, upper and lower punches 21 and 31 for shaping the main section 1, and upper and lower punches 22 and 32 for shaping the cap section 2. A powder is charged into the mold in a usual manner to form a green compact 81 for the main section and a green compact 82 for the cap section.

A sintering is conducted in a usual manner. Alternatively, a previous sintering may be conducted that requires a lower sintering temperature.

Figure 4:
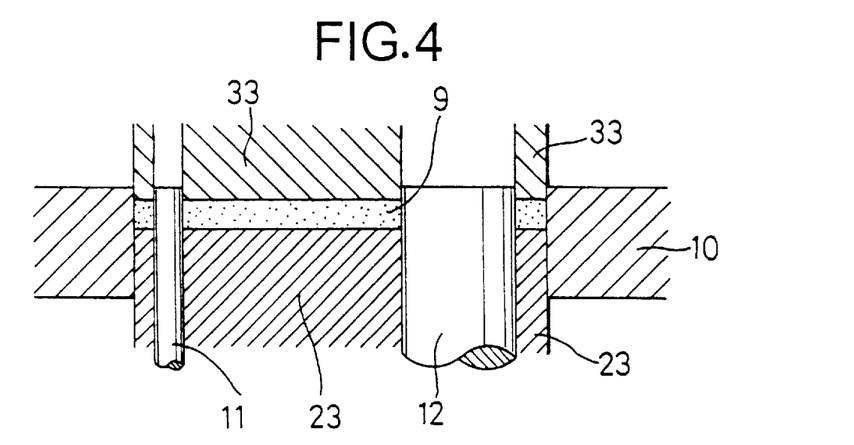
FIG. 4 is a vertical sectional view of an essential portion of a mold for explaining the plastic working of the connecting rod.
Figure 5A:
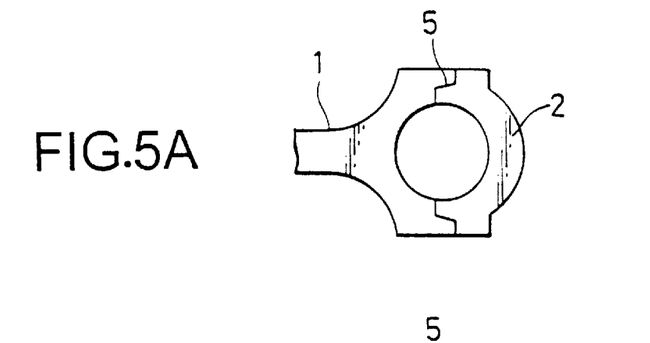
FIGS. 5A to 5E are plan views of a larger end of the connecting rod for explaining the state of mating faces of a main body section and a cap section.
Figures 5B, 5C, 5D:
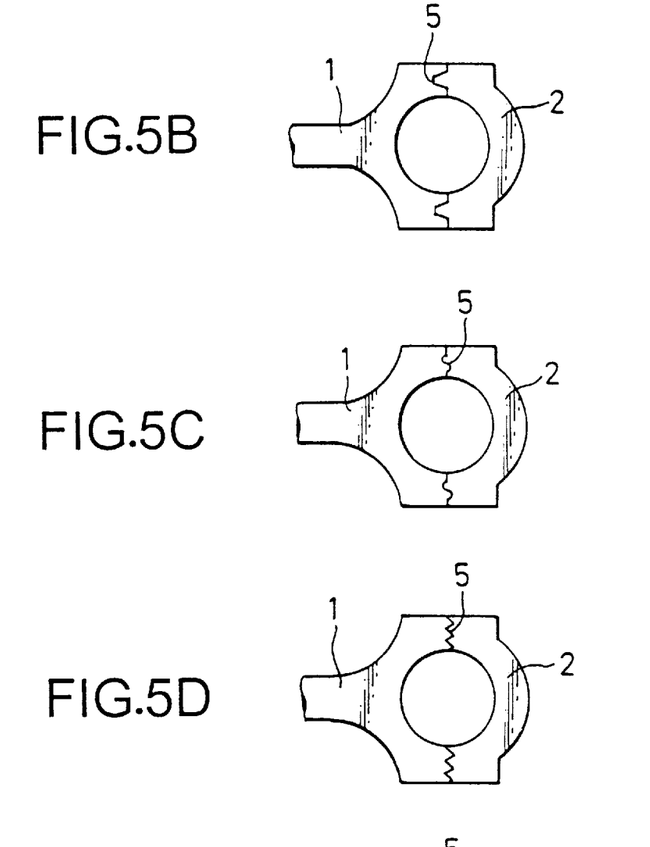
Figure 5E:
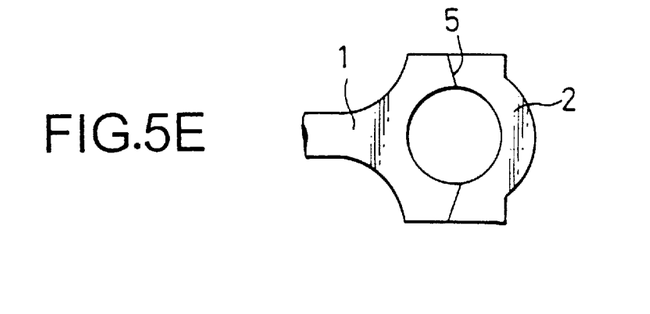

Sintered products for the main body section 1 and the cap section 2 are subjected to a plastic working in which they are compressed with division end faces 5 opposed to each other in a mold to which a plastically-working lubricant has been applied, as shown in FIG. 4. The mold is comprised of a die 10, a smaller-diameter core 11, a larger-diameter core 12 and upper and lower punches 23 and 33. When the density may not be very high, or when an alloy that can be easily plastically deformed is used, the sintered product is compressed at ambient temperature, similarly as in a usual sizing process or a coining process.

For a warm forging or a hot forging, the sintered product is heated in a furnace and compressed in a mold to which a lubricant has been applied. If the green compact is heated and sintered, and the sintered product is cooled from the heated state down to a forging temperature and then forged, the forging can be performed with a smaller energy.

When an aluminum alloy is used, an oxide film is formed on a surface of the sintered product. Therefore, even if the sintered product is subjected to the plastic working without being subjected to a special pre-treatment, the connecting rod can be easily divided into the main body section 1 and the cap section 2. However, if the sintered product is subjected to a coating-film forming treatment, an oxidizing treatment or bonderizing treatment (a phosphate coating treatment) when the connecting rod is made from an iron-based sintered alloy, the division after the plastic working is easily performed. When a coating film is provided on the sintered product in order to facilitate the division of the plastically-worked product at the division end faces, a spraying is suitable. The oxidizing treatment may be performed by exposing the sintered product to air at a cooling step. In the hot forging process, the oxidizing treatment may be performed by exposing the sintered product heated in a non-oxidizing atmosphere to the atmospheric air for a short time.

From the observation of the mating faces (the division faces) 5 of the plastically-worked connecting rod in the divided form, it can be seen that a plurality of wave-like wrinkles are formed substantially in parallel to a pressing direction, and the surface is undulated. If the main body section 1 and the cap section 2 are put into abutment against each other by utilizing the wave-like irregularities and the undulation of the mating faces (the division end faces) 5, both the members can be reliably and easily positioned without slipping.

When irregularities are previously provided on the mating faces (the division faces) 5 of the sintered blank by a powder forming mold, the mating face may be formed, for example, into any of shapes shown in FIGS. 5A to 5E. As the contact area of the mating face 5 is larger, the adhesion strength is larger. A moderate adhesion strength is suitable when a cutting or scraping and shaving processing is conducted before the division. The irregularities on the division end faces 5 are provided by the powder forming mold. In the case of irregularity shapes shown in FIGS. 5C and 5D, the irregularities may be formed on the division end face 5 of only one of the main body section 1 and the cap section 2, and the division end face 5 of the other member may be of a flat shape resulting from a compaction. If in this case the two blanks for the main body section 1 and the cap section 2 are compressed until they are meshed with each other when the plastic deformation is conducted, mating faces (division end faces) 5 with their irregularities matched with each other are produced.

The production of the connecting rod from the green compact will be described below.

Figure 6:
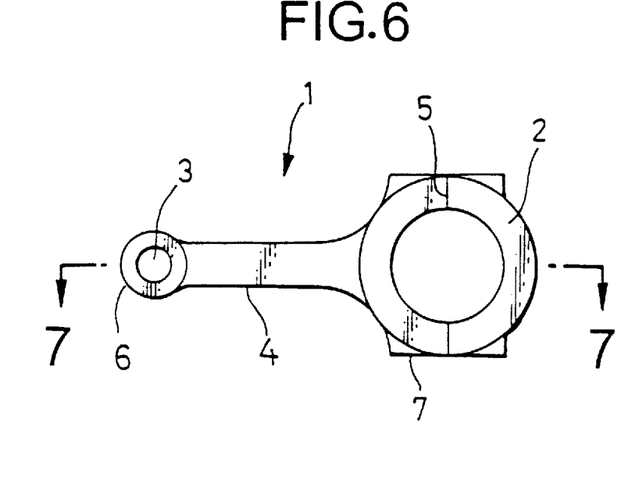
FIG. 6 is a plan view of a connecting rod blank formed of a green compact.
Figure 7:
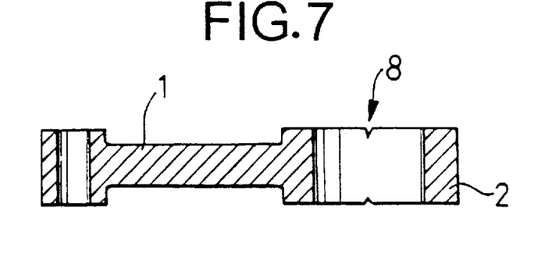
FIG. 7 is a sectional view taken along a line 7—7 in FIG. 6.

FIG. 6 is a plan view of a connecting rod blank formed of a green compact, and FIG. 7 is a vertical sectional view taken along a line 7—7 in FIG. 6. A difference in shape of this connecting rod blank from that shown in FIG. 2 is that the thickness of the smaller end 6 and the larger end 7 of this connecting rod blank is larger than that shown in FIG. 2. A groove 8 of V-shaped cross section and formed by a projection provided on a molding punch is provided in a mating face (a division end face) 5, i.e., an end face at which the blank is intended to be broken.

Figure 8:
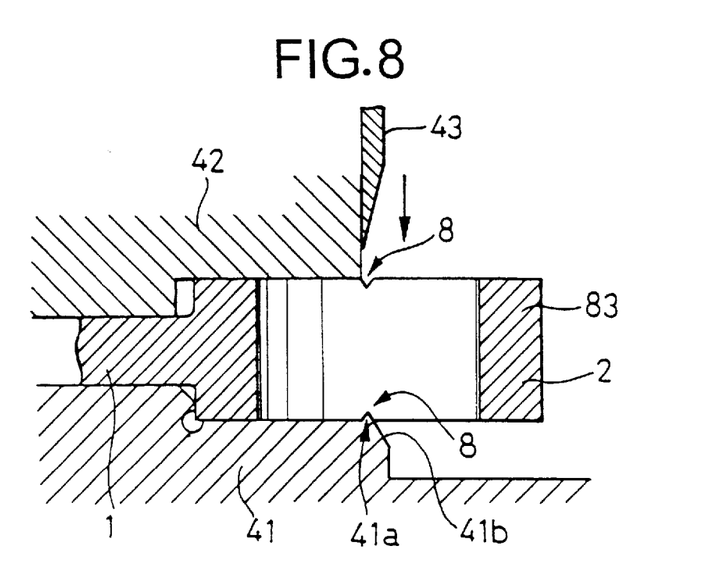
FIG. 8 is a vertical sectional view of an essential portion of a device for explaining a method for breaking the connection rod blank (green compact)

FIG. 8 is a vertical sectional view for explaining a step of breaking the connecting rod blank, i.e., the green compact 83. Only the main body section 1 of the green compact 83 is placed on a receiving jig 41 and clamped by a retaining jig 42. Profiles of the receiving jig 41 and the retaining jig 42 are adjusted so that a load applied from an edged tool 43 to the green compact 83 is not an unbalanced load. A projection 41a of the receiving jig 41 is fitted in a groove 8 in a lower surface of the green compact 83. A portion of the projection 41a closer to the cap section is a slope 41b. The edged tool 43 is pushed down from above the groove 8 in the upper surface along an end face of the retaining jig 42. When the edged tool 43 is pushed down to enter the green compact 83, a crack is created in the green compact 83 to break the green compact 83. If the edge of the upper surface of the cap section 2 is previously biased downwardly by a punch or the like in forcing the edged tool 43 to enter the green compact 83, fair broken faces (division end faces) are produced without a crack produced in the broken faces.

In the case of a thin cylindrical split bearing, it can be divided by previously fitting a core rod into an inner peripheral surface in a cylindrical green compact and forcing the edged tool to enter an outer peripheral surface of a green compact portion at which the green compact is intended to be divided.

The sintering and plastic working of the green compact are carried out in the same manner as in the above-described example. The irregularities on the mating face (division end face) 5 is further increase more than those in the above-described example, and the coupling force is also increased.

The sinter-bonding of the green compact will be described below.

The division end faces of a green compact formed in the above-described mold or a green compact broken by the edged tool are put into abutment against each other, and the green compact is retained by a sintering jig made of a heat-resistant material such as ceramics, so that it is prevented from being moved during sintering. In such a state, the green compact is sintered. To enhance the bonding force; a coating film of copper in the case of an iron alloy; or a coating film of tin in the case of a copper alloy, a coating film of a metal for alloying with the blank at a lower melting point such as tin (Sn), Al—Sn (0.5%) alloy, and Al—Zn (5%) alloy in the case of an aluminum alloy may be formed. To weaken the bonding force, a coating film of graphite or the like may be provided on the division end faces of the green compact.

The present invention will now be described by way of an embodiment in which an ingot material is used for the blank.

Figure 9:
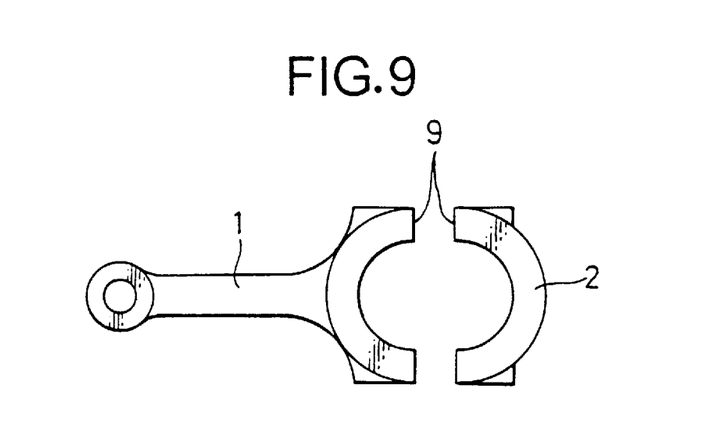
FIG. 9 is a plan view of a connecting rod blank formed of an ingot material.

A blank of a ductile cast iron and a casting of an aluminum alloy (corresponding to JIS alloy No. 2014) containing 1% of Si, 4% of Cu, 0.8% of Mn and 0.5% of Mg were fabricated into shapes shown in FIG. 9 of a main body section 1 and a cap section 2 into which a connecting rod was divided.

Figure 10:
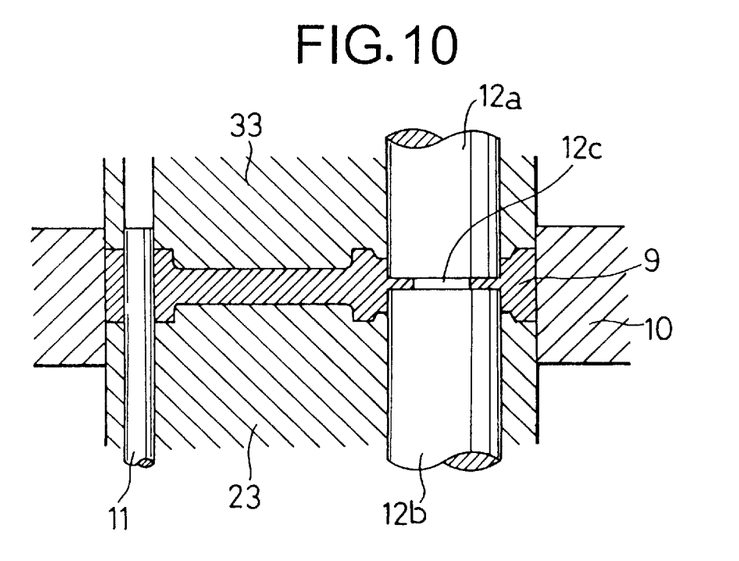
FIG. 10 is a vertical sectional view of an essential portion of a plastic working mold for the connecting rod blank shown in FIG. 9.

FIG. 10 is a vertical sectional view of a plastically working mold. The mold is comprised of a die 10, a smaller-diameter core 11, a larger-diameter core 12, and upper and lower punches 23 and 33. The larger-diameter core 12 is divided into a larger-diameter upper core 12a on the side of the upper punch 33, and a larger-diameter lower core 12b on the side of the lower punch 23, so that a gap 12C is created between both the cores, when a pressure is applied. When a connecting rod has been compressed by the upper and lower punches 23 and 33, division end faces are brought into close contact with each other, and an excess metal of the larger-diameter end 7 is formed in the gap 12C.

The blank of the cast iron was heated to 950° C., and the blank of the aluminum alloy was heated to 450° C. The blanks were placed into and pressed for plastic working as shown in FIG. 11 in the mold to which a graphite powder-dispersed lubricating oil was applied and which was heated to 400° C. The excess metal was produced on the inside diameter of the larger-diameter end, and the division end faces were in close contact with each other with a little undulation produced therein. Each of the plastically worked products was subjected to a shot blasting treatment, thereby removing stains on the surface and then, the excess metal was cut off. A tapered pin was inserted into the bore in the larger-diameter end to separate the main body section and the cap sections The blank of the cast iron is lower in separation load than the blank of the aluminum alloy. An undulation and a plurality of wrinkles in a direction of plastic flowing of the material were produced on the entire division end faces, so that both the end faces were meshed with each other. When the two members were again assembled to each other, the assembling could be performed correctly by utilizing the undulation and the wrinkles. The undulation and the wrinkles in the aluminum alloy were more considerable than those in the cast iron.

An embodiment of the present invention using an aluminum sintered alloy will be described below. The composition of the alloy described hereinafter is indicated by weight %.

Figure 11A:
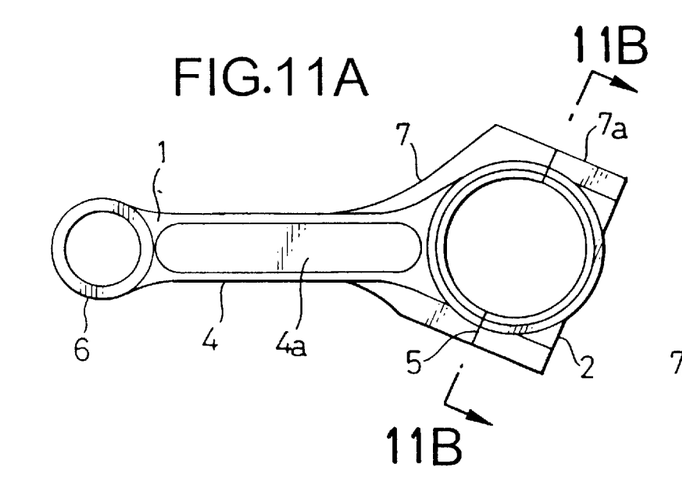
FIG. 11A is a plan view of another connecting rod produced by the process according to the present invention.
Figure 11B:
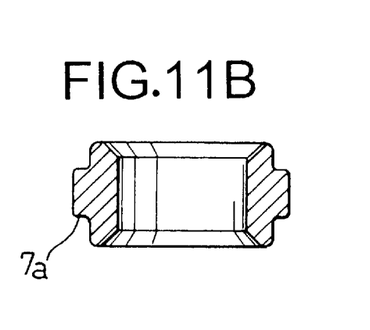
FIG. 11B is a sectional view taken along a line B—B in FIG. 11A.

The shape of the connecting rod is as shown in FIGS. 11A and 11B. FIG. 11A is a plan view of the connecting rod, and FIG. 11B is a sectional view taken along a line B—B in FIG. 11A. Elongated recesses 4a and 4a are provided on opposite surfaces of a rod portion 4. A flange 7a is provided around the larger-diameter ends 7, and the division end faces (mating faces) 5 are inclined at an angle of 67 degrees with respect to the axis of the rod portion 4.

A Cu—Ni (4%) alloy powder, Al—Mg (50%) alloy powder and a molding lubricant were mixed with a powder resulting from mixing of an Al—Si (20%) alloy powder and a pure aluminum powder at a ratio of 60:40 to provide a mixture having a composition comprising 12% of Si, 3% of Cu, 0.5% of Mg, 0.13% of Ni and the balance of Al. This powder mixture was compressed in a mold to separately fabricate green compacts for a main body section and a cap section each having a density of 2.25 g/cm³, and a green compact for another cap section having a density of 2.0 g/cm³.

In addition, a molding lubricant was mixed to a pure aluminum powder, and a resulting mixture was molded to provide a green compact having a shape of a cap section blank with a density of 2.2 g/cm³. These four green compacts were heated to a temperature of 400° C. to remove the molding lubricant and then sintered for 1 hour at 540° C. to produce a main body section (a blank A) of an aluminum alloy, a cap section (a blank B) of an aluminum alloy, a cap section (blank C) of an aluminum alloy having a low density, and a cap section (a blank D) of pure aluminum.

Using the former aluminum alloy green compact, a sample (blank E) and a sample (blank F) were fabricated. The sample (blank E) was produced by sintering the green compact in the same manner in a condition in which the division end faces of the main body section and the cap section were in abutment against each other. The sample (blank F) was produced by brushing a tin particulate-dispersed coating material onto the division end face of the main body and drying the division end face, and then sintering the green compact likewise in a condition in which the division end faces of the main body section and the cap section were in abutment against each other. When each of the samples (blanks E and F) made by the sinter bonding was divided at the division end faces, broken faces indicated that the main body section and the cap section were metallurgically bonded in a point-to-point manner or in a face-to-face manner. In the case of the sample (blank F) made through the application of tin to the bonding face, broken faces having increased irregularities were provided.

These blanks were subjected to a plastic working (a hot forging). The blanks used were a combination of the blanks A and B, a combination of the blanks A and C, a combination of the blanks A and D, and the blanks E and F made by the sinter bonding.

These blanks were heated to 450° C., and filled into and pressed in a mold to which a graphite powder-dispersed lubricating oil was applied and which was heated to 400° C., and they were then pressed and formed into shapes as shown in FIGS. 11A and 11B. The blanks E and F were excellent in workability for setting them in the mold.

Each of the plastically worked products was subjected to a shot blasting treatment to remove stains on the surface thereof. Then, the excess metal in an axial hole in the larger-diameter end was removed, and a tapered pin was inserted into the inner peripheral surface in the larger-diameter end to separate the main body section and the cap section from each other. The comparison of the maximum load required for the separation showed that the maximum load was higher in the case of the plastically worked products derived from the samples (blanks E and F) made by the sinter bonding, and lower in the case of the plastically worked product derived from the sample made using the low-density aluminum alloy for the cap section. In addition, in the plastically worked product derived from the sample (blank D) made using the pure aluminum for the cap section, the undulation was relatively large.

Figure 12:
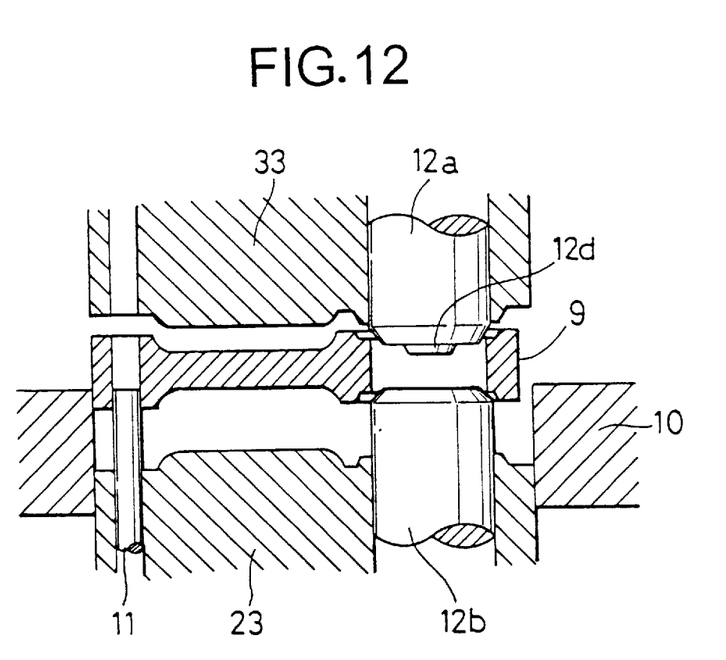
FIG.12 is a vertical sectional view of an essential portion of a plastic working mold for the connecting rod blank shown in FIG. 11.

FIG. 12 is a vertical sectional view of a plastically working mold. This mold has a structure substantially similar to that shown in FIG. 10. However, the inside bore in a die 10 on the side of the larger-diameter end is larger than the external shape of the blank; the outside diameters of larger-diameter upper and lower cores 12a and 12b are set larger than the inside diameter of the blank, and the axis of the core is mis-aligned from the axis of the bore in the blank, so that the cap section is separated rightwardly as viewed in FIG. 12, based on the inner surface of the main body section.

A projection 12d is provided on an end face of the larger-diameter upper core 12a. When the projection 12d is put into abutment against the larger-diameter lower core 12b, a gap 12c similar to that shown in FIG. 11 is created, so that the larger-diameter upper and lower cores 12a and 12b are lowered to and stopped at predetermined positions.

The blank is inserted into a die cavity in a state in which it is clamped by the larger-diameter upper and lower cores 12a and 12b. The inside diameter of the blank is expanded to break the sintered/bonded area or to form a crack in the sintered/bonded area. Then, the blank is compressed and plastically deformed by the upper and lower punches 23 and 33.

Using the mold shown in FIG. 12, the sintered and bonded blank (blank E) was heated for plastic working in the same manner as described above. The excess metal in the plastically worked product was cut off and then, a tapered pin was forced into the axial hole. A load required for separating the main body section and the cap section from each other was measured. This load was higher than that in the plastically worked product made using a non-sintered and non-bonded blank.

Then, the plastically worked product fabricated using the sintered and bonded blank (blank E) with both of the main body section and the cap section made of the aluminum alloy was used, and the excess metal within the axial bore in the larger end is punched off by the punch. Thereafter, the plastically worked product was compressed at 4 tons/cm$^3$ by the upper and lower punches in a mold of a usual structure to perform the sizing of inner and outer peripheral surfaces of each of the larger and smaller ends. The load required for the division of the sized product by the tapered pin was lower than that for the plastically worked product.

In addition, the blank E was heated to a temperature of 500° C. and then quenched by placing it into water, and subjected to an aging treatment at a temperature of 240° C. The load required for the division of this product was lower than that for the plastically worked product.

Figure 13:
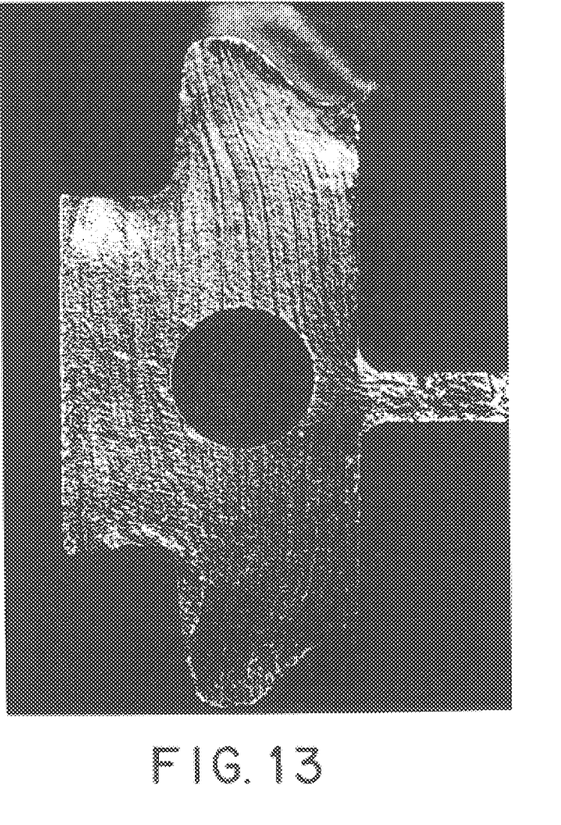
FIG. 13 is a photograph of an appearance of a division end face for explaining the irregularities of the division end face.

FIG. 13 is a photograph showing the appearance of a division surface of a product made by subjecting the sintered product of the main section (blank A) and the cap section (blank B) both made of the aluminum alloy to a plastic working in the mold shown in FIG. 10, quenching the plastically worked product from the temperature of 500° C. and then subjecting it to an aging treatment for 3 hours. A rounded bore is a bolt bore defined by drilling, and an elongatedly extending portion is an excess metal portion produced in an axial hole by the plastic working. Both the members, i.e., both the main body section and the cap section were not separated by the drilling of the bolt bore. The metallographic structure of this material is a mottled structure in which pores are little observed and which comprises an alloy phase in which primary crystals Si having the maximum grain size of about 25 μm are dispersed, and an aluminum solid solution phase.

As shown in FIG. 13, in the division end face, a projecting portion or a portion near the projecting portion is recessed and thus, forming a large undulation of about 0.5 to 1 mm, and a pattern comprising a large number of wavy furrows of about 0.05 mm are observed.

The undulation and irregularities of wavy furrows are meshed with those on the mating face of the mating member and therefore, the main body section member and the cap section member can be allowed to abut against each other by utilizing there undulation and the irregularities. Thus, in assembling connecting rod to an engine, the main body section member and the cap section member can be easily aligned with each other without slipping relative to each other, and can be positioned with a good accuracy.

The excess metal portion is a white broken surface. This indicates that the bonding of both the members by the plastic deformation is firm. Thus, in the boring process, both the members are difficult to be divided, and if the excess metal portion is eliminated, the members can be divided with a small external force.

An embodiment of a split bearing will now be described.

A powder of a lead-containing bronze-based alloy (LBC material) was compacted in a mold to provide a green compact having a cylindrical split shape. A sintered product from the green compact was pressed in a usual cylindrical bearing sizing mold to fabricate a cylindrical bearing with division end faces closely bonded to each other. This cylindrical bearing can be divided by press-fitting a tapered pin into a bore, and divided members can be easily united to each other by means of irregularities on the division end faces. Moreover, a predetermined degree of true circularness was achieved.

As discussed above, according to the producing process of the present invention, a plurality of blanks divided at an intended division face for a split type mechanical part or component, or a blank bonded product obtained by sintering and bonding a plurality of blanks are compressed in a mold to plastically deform them until their division end faces are cohered to each other. Therefore, the division can be easily performed at a simple step. Moreover, the plurality of blanks can be easily aligned with a good accuracy by utilizing the undulation and the wavy furrows produced on the division end faces as a result of the plastic deformation, and the connecting rod or the bearing can be produced with a good dimensional accuracy. The material for the plurality of blanks can be properly selected. Further, the closely bonding force can be properly adjusted by a combination of any of measures such as the provision of the irregularities on the division end faces, the sinter-bonding, the provision of the excess metal, the application of a releasable coating film to the intended division plane, a cold sizing, a quenching and the like. Therefore, it is possible to accommodate the demands of the size and the shape of the split type mechanical part and the cutting or scraping and shaving processing, and to produce the split type mechanical part with a good efficiency.

What is claimed is:

1. A process for producing a split type mechanical part, comprising the steps of:

preparing a plurality of blanks made of an ingot material or a sintered material, divided at intended dividing faces;

pressing the blanks with the intended dividing faces opposed to each other in a mold to plastically deform the blanks until the intended dividing faces are cohered to each other, thereby providing a plastically worked product; and applying a load to the plastically worked product in a direction to break said product at the intended divided faces, thereby breaking and dividing the plastically worked product into a plurality of members, wherein at least the intended dividing face of each of said blanks is subjected to a shot blasting treatment or a brushing and then, each of said blanks is pressed and plastically deformed until said plurality of members are cohered to each other or until said plurality of members are re-united.

2. A process for producing a split type mechanical part, comprising the steps of:

preparing a plurality of blanks made of a sintered material divided at intended dividing faces which are located so as to traverse a bore of a resultant product;

sintering and bonding the blanks with the intended dividing faces abutting against each other to provide a sintered product;

placing said sintered product into a plastically working mold while expanding said bore;

breaking said sintered product at sintered and bonded faces of the product, or producing a crack in said sintered product extending along the sintered and bonded faces and then, pressing broken pieces of the product or the product in a cracked state;

plastically deforming said broken pieces of the product or the cracked product until the pieces are cohered to each other or until the cracked product is re-united at the intended dividing faces, thereby providing a plastically worked product; and applying a load to the plastically worked product in a direction to break the plastically worked product at the intended dividing faces, thereby breaking and dividing the plastically worked product into a plurality of members.

3. A process for producing a split type mechanical part according to claim 1 or 2, wherein preparation of said blanks is achieved by simultaneously compacting and forming sintered alloy materials using a mold provided with a single die having cavities for shaping said blanks.

4. A process for producing a split type mechanical part according to claim 1 or 2, wherein the preparation of the blanks of said sintered material is achieved by compacting and forming a powdered material into an integral configuration having portions for the blanks united to each other to provide a green compact, and breaking and dividing said green compact at the intended dividing faces into broken pieces and then sintering the broken pieces of the green compact.

5. A process for producing a split type mechanical part according to claims 1 to 2, wherein as said blanks of the sintered material, a plurality of sintered products having different densities and having different heights in a pressing direction are used and plastically deformed.

6. A process for producing a split type mechanical part according to claim 5, wherein each of said blanks is made of a green compact of said sintered material, and a coating film of a metal which is melted at a temperature equal to or lower than a sintering temperature is formed on said intended dividing faces of at least one of said blanks, and then, the green compacts are sintered and bonded to each other with their intended dividing faces put into abutment against each other.

7. A process for producing a split type mechanical part according to claim 6, wherein a releasable coating film is provided on the intended dividing face of at least one of said blanks.

8. A process for producing a split type mechanical part according to claim 1 or 2, wherein in the plastic working of the mechanical part to be divided at the bore, a mold having a structure in which a core rod for shaping the bore of the mechanical part is axially divided into two portions and opposed faces of the portions of said core rod define a gap therebetween in the mold cavity is used, said blanks are pressed and plastically deformed until said blanks are cohered together at their intended division faces, thereby providing said plastically worked product, and a web is formed in the bore in said plastically worked product.

9. A process for producing a split type mechanical part according to claim 1 to 2, wherein the plastically worked product is obtained by a warm or hot plastic working and is then pressed and subjected to a sizing at ambient temperature, thereby increasing a stress around said intended division faces or cracks extending along said intended division faces.

10. A process for producing a split type mechanical part according to claim 1 or 2, wherein the plastically worked product or sized product is heated and quenched to increase a stress around the intended division faces or cracks extending along the intended division faces.

11. A process for producing a split type mechanical part according to claim 1 or 2, wherein said split type mechanical part is a connecting rod comprising a main section and a cap section.

12. A process for producing a split type mechanical part according to claim 1 or 2, wherein said split type mechanical part is a slide bearing.

13. A process for producing a split type mechanical part according to claim 1 or 2, wherein said blanks to be plastically worked are made of alloys having different compositions from those of the others of the blanks.

14. A process for producing a split type mechanical part according to claim 1 or 2, wherein each of said blanks is made of aluminum sintered alloy.

* * * * *